United States Patent
Mayer et al.

(10) Patent No.: US 11,764,822 B2
(45) Date of Patent: Sep. 19, 2023

(54) RADIO TRANSCEIVER CONTROL INTERFACE

(71) Applicant: Analog Devices, Inc., Wilmington, MA (US)

(72) Inventors: Christopher Mayer, Dover, MA (US); Manish J. Manglani, Summerfield, CA (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

(21) Appl. No.: 17/305,999

(22) Filed: Jul. 19, 2021

(65) Prior Publication Data

US 2022/0045709 A1 Feb. 10, 2022

Related U.S. Application Data

(60) Provisional application No. 62/706,239, filed on Aug. 6, 2020.

(51) Int. Cl.
*H04B 1/40* (2015.01)
(52) U.S. Cl.
CPC ..................................... *H04B 1/40* (2013.01)
(58) Field of Classification Search
CPC ...... H04B 1/38; H04B 1/3827; H04B 1/3833; H04B 1/40; H04J 1/00; H04J 1/02; H04J 3/00; H04J 3/02
USPC ................. 375/219, 220, 222, 259; 370/278, 370/280–282, 294, 295; 455/73, 88
See application file for complete search history.

(56) References Cited

U.S. PATENT DOCUMENTS

| | | | |
|---|---|---|---|
| 6,836,468 B1 | 12/2004 | O'toole et al. | |
| 7,324,837 B2 * | 1/2008 | Yamakita | H04B 17/0085 455/562.1 |
| 7,403,752 B2 | 7/2008 | Raghavan et al. | |
| 7,408,979 B2 | 8/2008 | Kodavati et al. | |
| 7,937,061 B2 | 5/2011 | Sugar et al. | |
| 8,351,982 B2 | 1/2013 | Rofougaran | |
| 8,391,821 B2 | 3/2013 | Okabe | |
| 8,520,564 B1 | 8/2013 | Lorg et al. | |
| 9,007,202 B1 * | 4/2015 | Chan | G08B 21/0247 340/539.13 |
| 9,014,240 B2 | 4/2015 | Ueda et al. | |
| 10,057,864 B2 | 8/2018 | Su et al. | |
| 10,326,501 B2 | 6/2019 | Sugar et al. | |
| 11,144,482 B1 * | 10/2021 | Hush | H04L 12/40104 |
| 2004/0166823 A1 | 8/2004 | Alderton | |
| 2016/0113016 A1 * | 4/2016 | Kim | H04W 52/0222 370/312 |

(Continued)

*Primary Examiner* — Young T. Tse
(74) *Attorney, Agent, or Firm* — Knobbe, Martens, Olson & Bear, LLP

(57) ABSTRACT

Radio transceiver control interfaces are provided herein. In certain embodiments, a semiconductor die includes a group of transmitters and a group of receivers that operate as a transceiver. Additionally, a group of common pins are used to control settings of both the transmitters and receivers. In one example, data received on the common pins can be used to establish enable settings for each of the transmitters and receivers. Thus, rather than using a one-to-one correspondence between a pin and the setting of a particular transmitter or receiver, a mapping is used between the common pins and the settings of the transmitters and receivers.

20 Claims, 3 Drawing Sheets

(56) References Cited

U.S. PATENT DOCUMENTS

2016/0277098 A1\* 9/2016 Decker ................. H04B 10/03
2019/0007132 A1\* 1/2019 Maniloff .............. H04B 10/032

\* cited by examiner

RADIO TRANSCEIVER CONTROL INTERFACE

CROSS-REFERENCE TO RELATED APPLICATIONS

The present application claims priority to U.S. Provisional Patent Application No. 62/706,239, filed Aug. 6, 2020, and titled "RADIO TRANSCEIVER CONTROL INTERFACE," the entirety of which is hereby incorporated herein by reference.

FIELD OF THE DISCLOSURE

Embodiments of the invention relate to electronic systems, and more particularly to, a control interface for a radio transceiver.

DESCRIPTION OF THE RELATED TECHNOLOGY

Radio transceivers can be used in a wide variety of radio frequency (RF) communication systems. For example, transceivers can be included in base stations or mobile devices to transmit and receive signals associated with a wide variety of communications standards, including, for example, cellular and/or wireless local area network (WLAN) standards. Transceivers can also be used in radar systems, instrumentation, industrial electronics, military electronics, laptop computers, digital radios, and/or other electronics.

SUMMARY OF THE DISCLOSURE

Radio transceiver control interfaces are provided herein. In certain embodiments, a semiconductor die includes a group of transmitters and a group of receivers that operate as a transceiver. Additionally, a group of common pins are used to control settings of both the transmitters and receivers. In one example, data received on the common pins can be used to establish enable settings for each of the transmitters and receivers. Thus, rather than using a one-to-one correspondence between a pin and the setting of a particular transmitter or receiver, a mapping is used between the common pins and the settings of the transmitters and receivers. By implementing the transceiver's interface in this manner, the number of pins of the semiconductor die is reduced. Moreover, routing congestion is alleviated while allowing pins to either be omitted to reduce pin count or used for other purposes, such as enhanced functionality or implementing a more robust ground or power supply network.

In one aspect, a transceiver integrated circuit (IC) includes a plurality of transmitters, a plurality of receivers, a plurality of common pins configured to receive data for controlling the transmitters and the receivers, and a control circuit configured to map the data received on the common pins to a first plurality of settings of the transmitters and to a second plurality of settings of the receivers.

In another aspect, a radio frequency (RF) communication system includes a front-end system configured to receive a plurality of RF transmit signals, and to provide a plurality of RF receive signals, and a transceiver. The transceiver includes a plurality of transmitters configured to generate the plurality of RF transmit signals, a plurality of receivers configured to receive the plurality of RF receive signals, a plurality of common pins configured to receive data for controlling the transmitters and the receivers, and a control circuit configured to map the data received on the common pins to a first plurality of settings of the transmitters and to a second plurality of settings of the receivers.

In another aspect, a method of transceiver configuration is provided. The method includes receiving data controlling a plurality of transmitters and a plurality of receivers on a plurality of common pins of a transceiver IC, and mapping the data received on the common pins to a first plurality of settings of the transmitters and to a second plurality of settings of the receivers using a control circuit of the transceiver IC.

DETAILED DESCRIPTION

Figure 1:
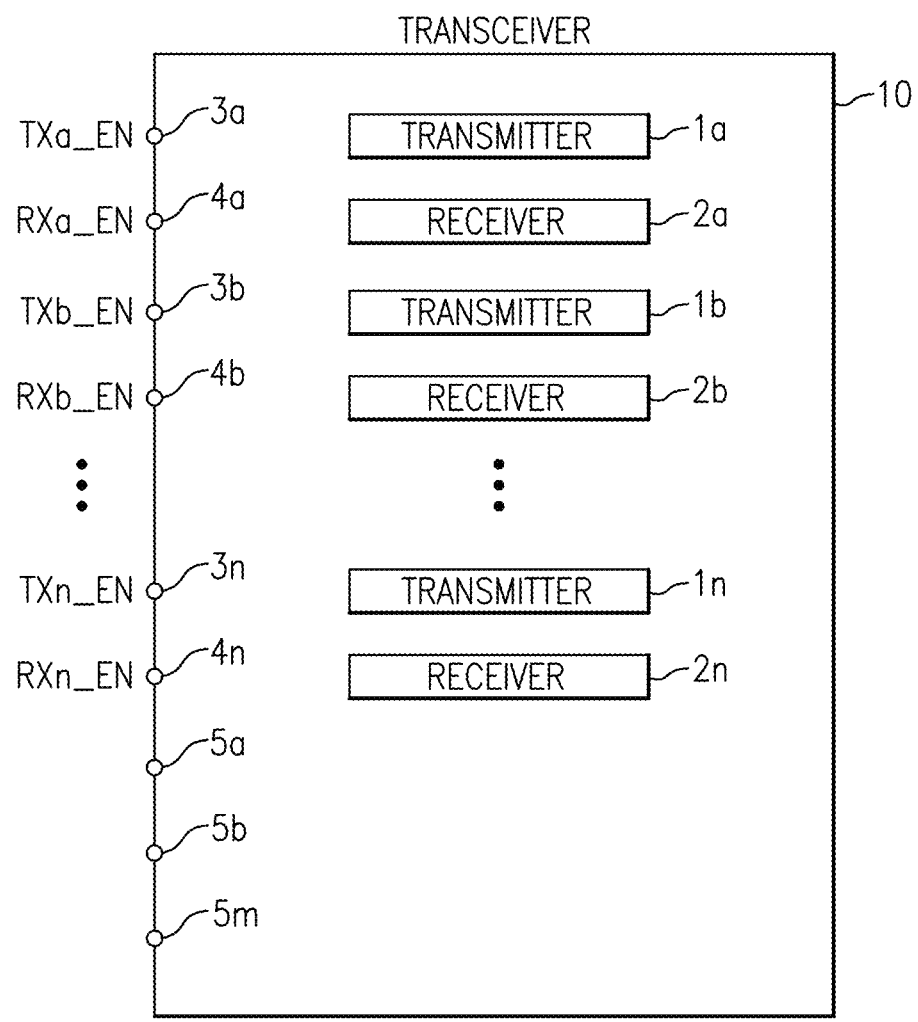
FIG. 1 is a schematic diagram of one example of a transceiver chip.

The following detailed description of embodiments presents various descriptions of specific embodiments of the invention. However, the invention can be embodied in a multitude of different ways. In this description, reference is made to the drawings in which like reference numerals may indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Transmit channels, receive channels, and/or observation channels of a radio transceiver can be configured to operate with various settings to achieve desired operating performance. Such settings can be provided by a user over pins of a semiconductor die on which the transceiver is fabricated. For example, the semiconductor die can include an enable pin for each transmit channel, for each receive channel, and for each observation channel. The individual channel enable pins are used for enabling that channel at a particular time.

In certain applications, such as massive multiple-input-multiple-output (MIMO) systems, a relatively large number of parallel RF transceiver channels simultaneously process signals associated with an antenna array.

To accommodate parallel signaling in such systems, a transceiver die can include multiple transmit and receive channels, such as 8 or more transmit channels and 8 or more receive channels. Furthermore, such transceiver dies can include additional pins for configuring gain and/or frequency conversion settings of the channels. When including a dedicated pin or set of pins for each channel, the number of pins of the transceiver die can become unduly large.

Radio transceiver control interfaces are provided herein. In certain embodiments, a semiconductor die includes a group of transmitters and a group of receivers that operate as a transceiver. Additionally, a group of common pins are used to control settings of both the transmitters and receivers. In one example, data received on the common pins can be used to establish enable settings for each of the transmitters and receivers. Thus, rather than using a one-to-one correspondence between a pin and the setting of a particular transmitter or receiver, a mapping is used between the common pins and the settings of the transmitters and receivers.

By implementing the transceiver's interface in this manner, the number of pins of the semiconductor die is reduced. Moreover, routing congestion is alleviated while allowing pins to either be omitted to reduce pin count or used for other purposes, such as enhanced functionality or implementing a more robust ground or power supply network.

The semiconductor die can also include one or more observation receivers, which can be used for observing the transmitters for purposes of performing digital pre-distortion (DPD) and/or power control. Such observation receivers can also have settings controlled by data received from the group of common pins.

In certain implementations, the semiconductor die further includes registers storing data for controlling the transmitters and receivers, and a register mapping circuit coupled to the group of common pins and configured to provide data to the registers. The resister mapping circuit is used to convert an input data vector received from the common pins into corresponding data in the registers for controlling the transmitters and receivers.

The pins are shared across the transmitters and receivers, and thus the register mapping circuit maps a value of the input data vector to corresponding settings of the transmitters and receivers. Thus, a particular pin of the group of common pins can impact the settings associated with multiple channels, for instance, two or more transmitters and/or two or more receivers.

The settings controlled by the group of common pins can correspond to a wide variety of types of settings. For example, the group of common pins can control not only enable settings of transmitters and receivers, but other settings as well, including, but not limited to, settings for frequency conversion (for example, values for a numerically controlled oscillator (NCO) for provided frequency upconversion or downconversion) and/or gain settings.

Moreover, data received on the pins can be used to indicate data for setting the transceiver's channels to proper values for a testing mode, which can be associated with either frequency division duplexing (FDD) or time division duplexing (TDD).

In a first example, the testing mode corresponds to an antenna test mode, and frequency conversion settings for observation receiver(s) in the antenna test mode can be changed for the FDD scenario relative to the TDD scenario to account for transmitting and receiving on different frequencies (for the case of FDD) or transmitting and receiving on the same frequency but at different time slots (for the case of TDD). Accordingly, a proper frequency spectrum can be observed for both FDD and TDD during the antenna testing mode. In a second example, the testing mode corresponds to measuring for voltage standing wave ratio (VSWR).

The transceivers herein can handle signals of a variety of frequencies, including not only RF signals between 100 MHz and 7 GHz, but also signals of higher frequencies, such as those in the X band (about 7 GHz to 12 GHz), the $K_u$ band (about 12 GHz to 18 GHz), the K band (about 18 GHz to 27 GHz), the $K_a$ band (about 27 GHz to 40 GHz), the V band (about 40 GHz to 75 GHz), and/or the W band (about 75 GHz to 110 GHz). Accordingly, the teachings herein are applicable to a wide variety of RF communication systems, including microwave systems.

FIG. 1 is a schematic diagram of one example of a transceiver chip 10.

The transceiver chip 10 includes a group of transmitters 1a, 1b, . . . 1n and a group of receivers 2a, 2b, . . . 2n. Although three transmitters and three receivers are depicted, any number of receivers and transmitters can be included as indicated by the ellipsis. Moreover, the number of transmitters and receivers need not be equal.

Although not depicted in FIG. 1, the transceiver chip 10 can also include other circuitry, for example, observation receivers, control circuits, calibration circuits, and/or power control circuits. The transceiver chip 10 is also referred to herein as a transceiver semiconductor die or a transceiver integrated circuit (IC).

As shown in FIG. 1, the transceiver chip 10 includes separate pins for enabling each of the depicted transmitters and receivers. For example, the transceiver chip 10 includes a transmitter enable pin TXa_EN for enabling the transmitter 1a, a transmitter enable pin TXb_EN for enabling the transmitter 1b, a transmitter enable pin TXn_EN for enabling the transmitter 1n, a receiver enable pin RXa_EN for enabling the receiver 2a, a receiver enable pin RXb_EN for enabling the receiver 2b, and a receiver enable pin RXn_EN for enabling the receiver 2n.

Although separate pins related to an enabling function (turning on/turning off) are depicted, the transmitter and receivers can include separate pins for other functions, such as gain control or frequency shifting (for example, NCO settings for frequency upconversion or frequency downconversion).

As shown in FIG. 1, the transceiver chip 10 can further include other pins 5a, 5b, . . . 5m for this or other functionality, including, but not limited to, receiving power supply voltages, receiving ground voltages, and/or controlling observation receivers (not shown in FIG. 1).

For certain applications, such as massive MIMO applications, the transceiver die 10 can include a large number of transmitters and receivers, for example, 8 or more transmitters and 8 or more receivers. When including a dedicated pin or set of pins for each channel, the number of pins of the transceiver die 10 can become unduly large.

Figure 2:
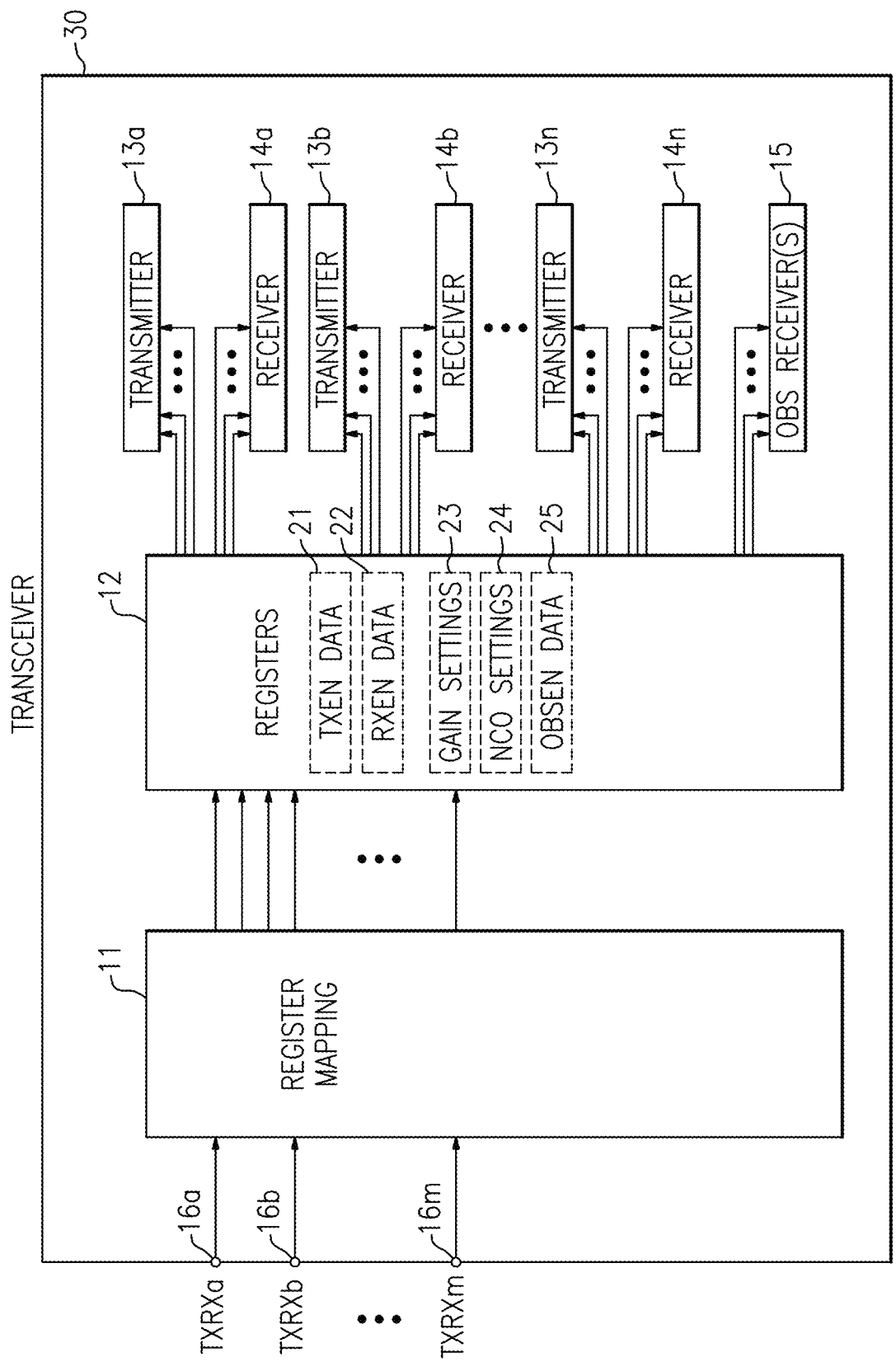
FIG. 2 is a schematic diagram of a transceiver chip according to one embodiment.

FIG. 2 is a schematic diagram of a transceiver chip 30 according to one embodiment. The transceiver chip 30 includes a register mapping circuit 11, registers 12, a group of transmitters 13a, 13b, . . . 13n, a group of receivers 14a, 14b, . . . 14n, and one or more observation receivers 15.

Although one example of circuitry of the transceiver chip 30 is depicted, other implementations are possible.

The transceiver chip 30 also includes a group of common pins 16a, 16b, . . . 16m (labeled TXRXa, TXRXb, . . . TXRXm, respectively) for controlling the transmitters 13a, 13b, . . . 13n and receivers 14a, 14b, . . . 14n. As shown in FIG. 2, the common pins 16a, 16b, . . . 16m are connected to the register mapping circuit 11, which processes data received from the common pins 16a, 16b, . . . 16m to control data stored in the registers 12.

The resister mapping circuit 11 is used to convert an input data vector received from the common pins 16a, 16b, . . . 16m into corresponding data in the registers 12 for controlling the transmitters 13a, 13b, . . . 13n and the receivers 14a, 14b, . . . 14n. The data from the register mapping circuit 11 is also used to control the observation receiver 15, in this embodiment.

The common pins 16a, 16b, . . . 16m advantageously receive the input data vector in parallel, and thus offers speed and latency advantages over a serial configuration.

In the illustrated embodiment, the pins 16a, 16b, . . . 16m are shared across the transmitters 13a, 13b, . . . 13n, the receivers 14a, 14b, . . . 14n, and observation receiver(s) 15, and thus the register mapping circuit 11 maps a value of the input data vector to corresponding channels settings of the transmitters and receivers. In certain implementations, the number of common pins 16a, 16b, . . . 16m are fewer in number compared to the total number of transmitters and receivers controlled by the pins.

Thus, a particular pin of the group of common pins can impact the settings associated with multiple channels (for instance, all channels or at least two channels). In certain implementations, the register mapping circuit 11 includes a table relating values of data received on the pins 16a, 16b, . . . 16m to corresponding settings of the transmitters and receivers.

The settings controlled by the group of common pins 16a, 16b, . . . 16m can correspond to a wide variety of types of settings. For example, the group of common pins 16a, 16b, . . . 16m can control not only enable settings of transmitters and receivers, but other settings as well, including, but not limited to, settings for frequency conversion (for example, values for NCOs for provided frequency upconversion or downconversion) and/or gain settings.

For example, in the illustrated embodiment, the registers 12 (which are controlled by the register mapping circuit 11) include transmit enable data 21 (TXEN DATA) for selectively enabling each of the transmitters 13a, 13b, . . . 13n, receive enable data 22 (RXEN DATA) for selectively enabling each of the receivers 14a, 14b, . . . 14n, gain settings 23 for separately setting the gains of each of the transmitters and each of the receivers, NCO settings 24 for separately setting frequency conversion settings for each of the transmitters and each of the receivers, and observation enable data 25 (OBSEN DATA) for selectively enabling the observation receiver(s) 15.

Although an example of settings controlled by the common pins 16a, 16b, . . . 16m is depicted, other implementations are possible.

Figure 3:
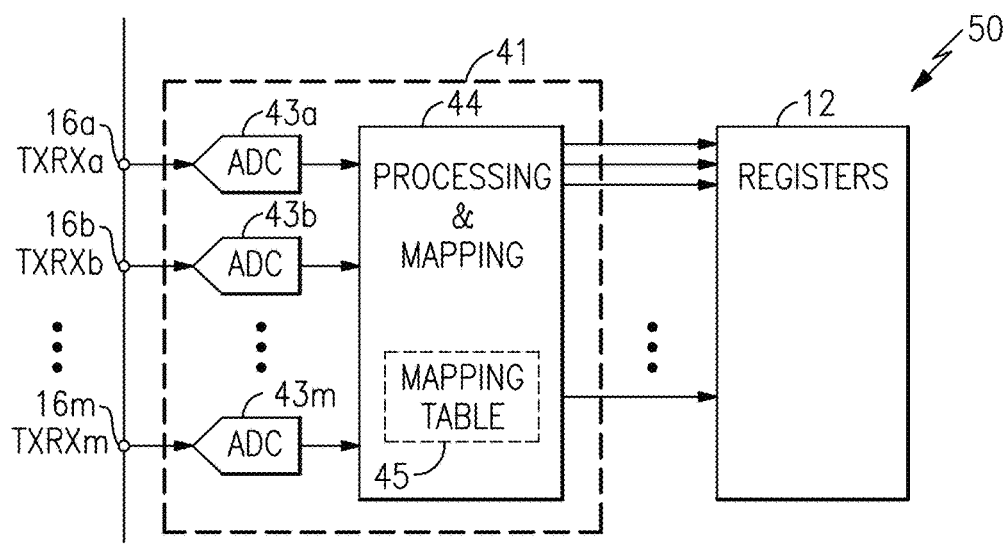
FIG. 3 is a schematic diagram of a portion of a transceiver chip according to another embodiment.

FIG. 3 is a schematic diagram of a portion of a transceiver chip 50 according to another embodiment. The depicted portion of the transceiver chip 50 includes a register mapping circuit 41 and registers 12 for controlling the transceiver chip's transmitters and receivers (not shown in FIG. 3). The transceiver chip 50 further includes a group of common pins 16a, 16b, . . . 16m.

In the illustrated embodiment, the register mapping circuit 41 includes analog-to-digital converters (ADCs) 43a, 43b, . . . 43m for digitizing signals received on the pins 16a, 16b, . . . 16m, respectively. The digitized signals are provided to the processing and mapping circuit 44, which can include a mapping table 45 that maps the input data vector (corresponding to the digitized values of the signals received on the pins 16a, 16b, . . . 16m) to corresponding values of settings for storing in the registers 12.

In certain implementations, the ADCs 43a, 43b, . . . 43m are controlled by a common clock signal, and thus capture an input data vector from the pins 16a, 16b, . . . 16m in parallel. Thus, the input data vector can be updated as desired by the user and regularly sampled by the ADCs 43a, 43b, . . . 43m. In another implementation, the interface operates without a clock signal, thereby reducing power consumption and enhancing speed relative to a serial interface with clock and data pins.

Figure 4:
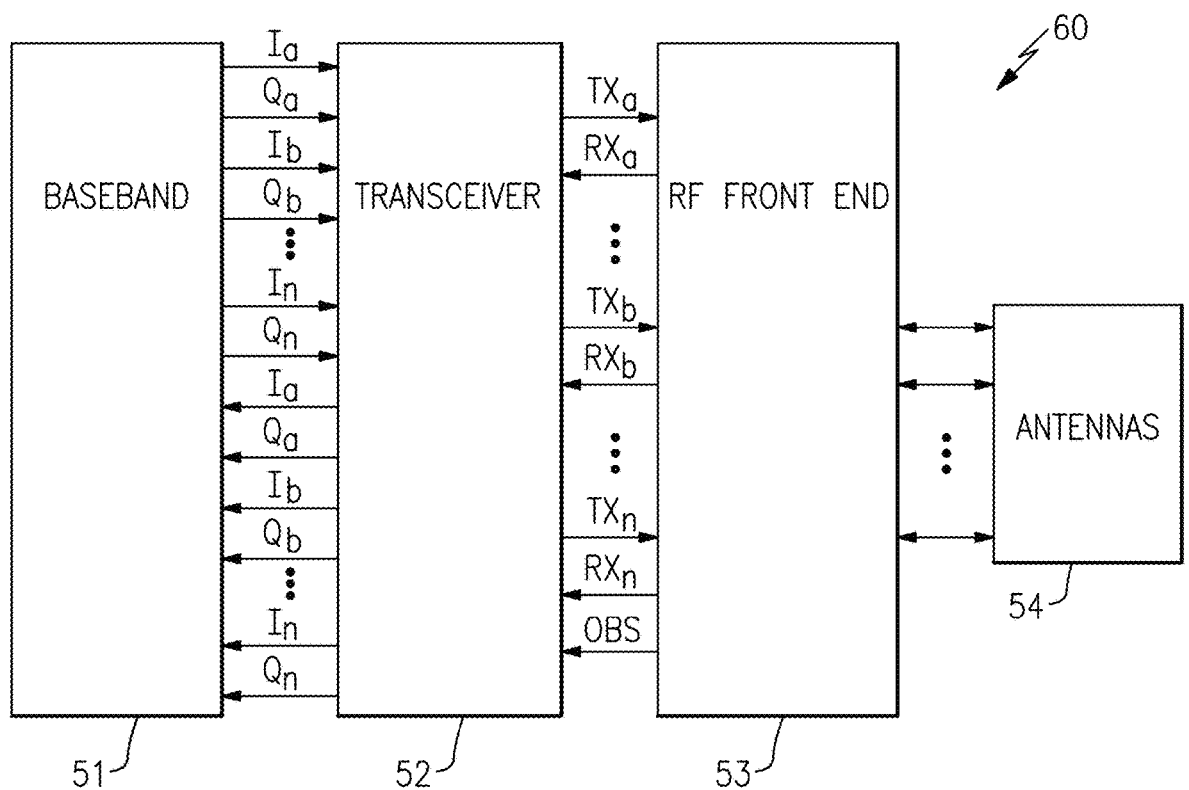
FIG. 4 is a schematic diagram of a radio frequency (RF) communication system according to one embodiment.

FIG. 4 is a schematic diagram of an RF communication system 60 according to one embodiment. The RF communication system 60 includes a baseband processor 51, a transceiver 52, an RF front end 53, and antennas 54.

The baseband processor 51 generates I and Q transmit data for transmitters of the transceiver 52. Additionally, the I and Q transmit data is processed by the transmitters of the transceiver 52 to generate RF transmits signals $TX_a$, $TX_b$, . . . $TX_n$. One or more of the RF transmit signals $TX_a$, $TX_b$, . . . $TX_n$ can be transmitted using the antennas 54. In certain implementations, the antennas 54 correspond to an antenna array.

The transmitters of the transceiver 52 can serve to provide a wide variety of functions, including analog-to-digital data conversion, filtering, gain control, and frequency upconversion to RF (for example, using a mixer controlled by an NCO or other suitable oscillator).

The antennas 54 are also coupled to the RF front end 53 for purposes of receiving RF signals. As shown in FIG. 4, the RF front end 53 provides the transceiver 52 with RF receive signals $RX_a$, $RX_b$, . . . $RX_n$. Additionally, the receivers of the transceiver 52 process the RF receive signals to generate I and Q receive data for the baseband processor 51.

The receivers of the transceiver 52 can serve to provide a wide variety of functions, including frequency downconversion to intermediate frequency (IF) or baseband (for example, using a mixer controlled by an NCO or other suitable oscillator), filtering, gain control, and digital-to-analog conversion.

As shown in FIG. 4, the RF front end also provides an observation signal OBS for processing by an observation receiver of the transceiver 52. For example, the output transmit power (for instance, from a power amplifier) can be sensed in the RF front end using a directional coupler or other suitable structure, and provided to the transceiver 52 as the observation signal OBS. The observation signal OBS can be processed by an observation receiver of the transceiver 52 to aid in providing transmit power control and/or DPD.

The transceiver 52 can be implemented in accordance with any of the embodiments herein. Although the RF communication system 60 of FIG. 4 illustrates one embodiment of an RF communication system that can include a transceiver, the teachings herein are applicable to transceivers implemented in a wide variety of communication system. Accordingly, other implementations are possible.

CONCLUSION

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while the disclosed embodiments are presented in a given arrangement, alternative embodiments may perform similar functionalities with different components and/or circuit topologies, and some elements may be deleted, moved, added, subdivided, combined, and/or modified. Each of these elements may be implemented in a variety of different ways. Any suitable combination of the elements and acts of the various embodiments described above can be combined to provide further embodiments. Accordingly, the scope of the present invention is defined only by reference to the appended claims.

Although the claims presented here are in single dependency format for filing at the USPTO, it is to be understood that any claim may depend on any preceding claim of the same type except when that is clearly not technically feasible.

What is claimed is:

1. A transceiver integrated circuit (IC) comprising:
 a plurality of transmitters;
 a plurality of receivers;
 a plurality of common pins configured to receive an input data vector for controlling channel settings of the plurality of transmitters and the plurality of receivers, the input data vector received in parallel on the plurality of common pins, wherein a total number of the plurality of common pins is smaller than a total number of the plurality of transmitters and the plurality of receivers; and
 a control circuit configured to convert the input data vector to digitized values of signals and to map the digitized values of signals to a first plurality of channel settings of the plurality of transmitters and to a second plurality of channel settings of the plurality of receivers.

2. The transceiver IC of claim 1, wherein the first plurality of channel settings include a plurality of transmitter enable settings for individually enabling each of the plurality of transmitters, and the second plurality of channel settings include a plurality of receiver enable settings for individually enabling each of the plurality of receivers.

3. The transceiver IC of claim 1, wherein the first plurality of channel settings include a plurality of frequency conversion settings for each of the plurality of transmitters.

4. The transceiver IC of claim 3, wherein the plurality of frequency conversion settings include at least one numerically controlled oscillator (NCO) setting.

5. The transceiver IC of claim 1, wherein the second plurality of channel settings include a plurality of frequency conversion settings for each of the plurality of receivers.

6. The transceiver IC of claim 1, wherein the first plurality of channel settings include a plurality of gain settings of the plurality of transmitters, and the second plurality of channel settings include a plurality of gain settings of the plurality of receivers.

7. The transceiver IC of claim 1, further comprising at least one observation receiver having a third plurality of channel settings, the control circuit further configured to map the digitized values of signals to the third plurality of channel settings.

8. The transceiver IC of claim 1, further comprising a plurality of registers storing the first plurality of channel settings and the second plurality of channel settings, wherein the control circuit comprises a register mapping circuit.

9. The transceiver IC of claim 8, wherein the register mapping circuit comprises a register mapping table storing data mapping the digitized values of signals to data stored in the plurality of registers.

10. The transceiver IC of claim 1, wherein the control circuit comprises a plurality of analog-to-digital converters configured to convert the input data vector to the digitized values of signals.

11. A radio frequency (RF) communication system comprising:
 a front-end system configured to receive a plurality of RF transmit signals, and to provide a plurality of RF receive signals; and
 a transceiver comprising:
  a plurality of transmitters configured to generate the plurality of RF transmit signals for the front-end system;
  a plurality of receivers configured to receive the plurality of RF receive signals from the front-end system;
  a plurality of common pins configured to receive an input data vector for controlling channel settings of the plurality of transmitters and the plurality of receivers, the input data vector received in parallel on the plurality of common pins, wherein a total number of the plurality of common pins is smaller than a total number of the plurality of transmitters and the plurality of receivers; and
  a control circuit configured to convert the input data vector to digitized values of signals and to map the digitized values of signals to a first plurality of channel settings of the plurality of transmitters and to a second plurality of channel settings of the plurality of receivers.

12. The RF communication system of claim 11, wherein the RF communication system further comprises a baseband processor configured to provide in-phase (I) transmit data and quadrature-phase (Q) transmit data to the plurality of transmitters, and to receive I receive data and Q receive data from the plurality of receivers.

13. The RF communication system of claim 11, wherein the first plurality of channel settings include a plurality of transmitter enable settings for individually enabling each of the plurality of transmitters, and the second plurality of channel settings include a plurality of receiver enable settings for individually enabling each of the plurality of receivers.

14. A method of transceiver configuration, the method comprising:
 receiving an input data vector for controlling channel settings of a plurality of transmitters and a plurality of receivers on a plurality of common pins of a transceiver IC, the input data vector received in parallel on the plurality of common pins, wherein a total number of the plurality of common pins is smaller than a total number of the plurality of transmitters and the plurality of receivers;
 converting the input data vector to digitized values of signals using a control circuit of the transceiver IC; and
 mapping the digitized values of signals to a first plurality of channel settings of the plurality of transmitters and to a second plurality of channel settings of the plurality of receivers using the control circuit of the transceiver IC.

15. The method of claim 14, wherein the first plurality of channel settings include a plurality of transmitter enable settings for individually enabling each of the plurality of transmitters, and the second plurality of channel settings include a plurality of receiver enable settings for individually enabling each of the plurality of receivers.

16. The method of claim 14, wherein the first plurality of channel settings include a plurality of frequency conversion settings for each of the plurality of transmitters, and the second plurality of channel settings include a plurality of frequency conversion settings for each of the plurality of receivers.

17. The method of claim 14, wherein the first plurality of channel settings include a plurality of gain settings of the plurality of transmitters, and the second plurality of channel settings include a plurality of gain settings of the plurality of receivers.

18. The method of claim 14, further comprising mapping the digitized values of signals to a third plurality of channel settings of at least one observation receiver using the control circuit of the transceiver IC.

19. The method of claim 14, further comprising storing the first plurality of channel settings and the second plurality of channel settings in a plurality of registers of the transceiver IC.

20. The method of claim 19, further comprising mapping the digitized values of signals to data stored in the registers using a mapping table.

* * * * *